Oct. 6, 1942.　　　　W. C. KLEIN　　　　2,298,135
ROTARY REEL ELECTRIC LAWN MOWER
Filed Oct. 31, 1940　　　3 Sheets-Sheet 1

Inventor
William C. Klein
By L. F. Kandreth
Attorney

Oct. 6, 1942.     W. C. KLEIN     2,298,135
ROTARY REEL ELECTRIC LAWN MOWER
Filed Oct. 31, 1940     3 Sheets-Sheet 2
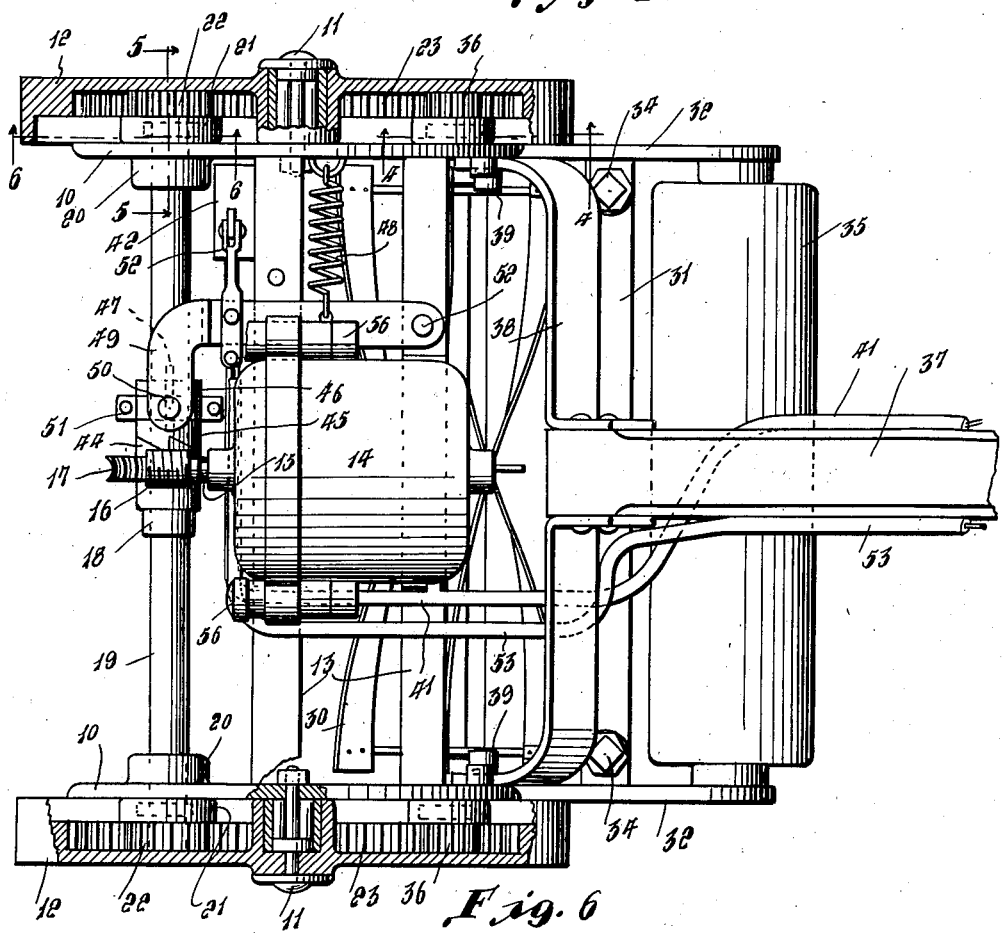
Fig. 2.
Fig. 6.
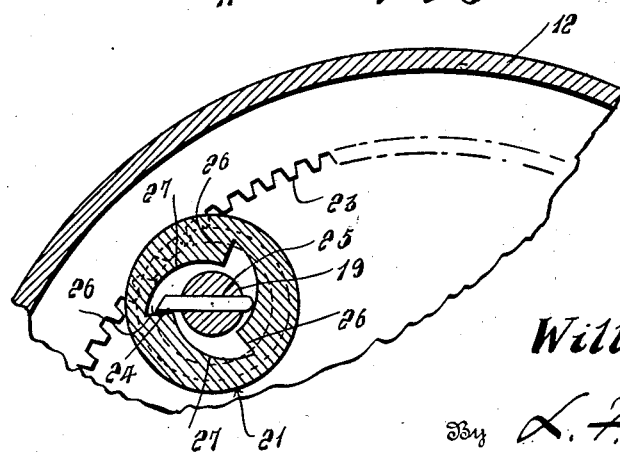
Inventor
William C. Klein
By L. F. Laudreth
Attorney Inventor
William C. Klein
By L. F. Randolph
Attorney Patented Oct. 6, 1942

2,298,135

UNITED STATES PATENT OFFICE 2,298,135

ROTARY REEL ELECTRIC LAWN MOWER

William C. Klein, Allentown, Pa.

Application October 31, 1940, Serial No. 363,741

2 Claims. (Cl. 56—26)

This invention relates to a lawn mower and it aims to provide a novel construction which is provided with a reel rotatable by an electric motor and a construction which is generally improved, simplified, and rendered more durable.

It is particularly aimed to provide a construction including a clutch and switch to control the operation of the reel, so located, that the mower may be operated by hand when the clutch is disengaged.

The more specific objects and advantages will be pointed out hereinafter or become apparent as the description proceeds with reference to accompanying drawings illustrating an operative embodiment.

In said drawings:

Figure 2 is a plan view of the mower, partly broken away;

Figure 6 is a detail section taken on the plane of line 6—6 of Figure 2.

Figure 1:
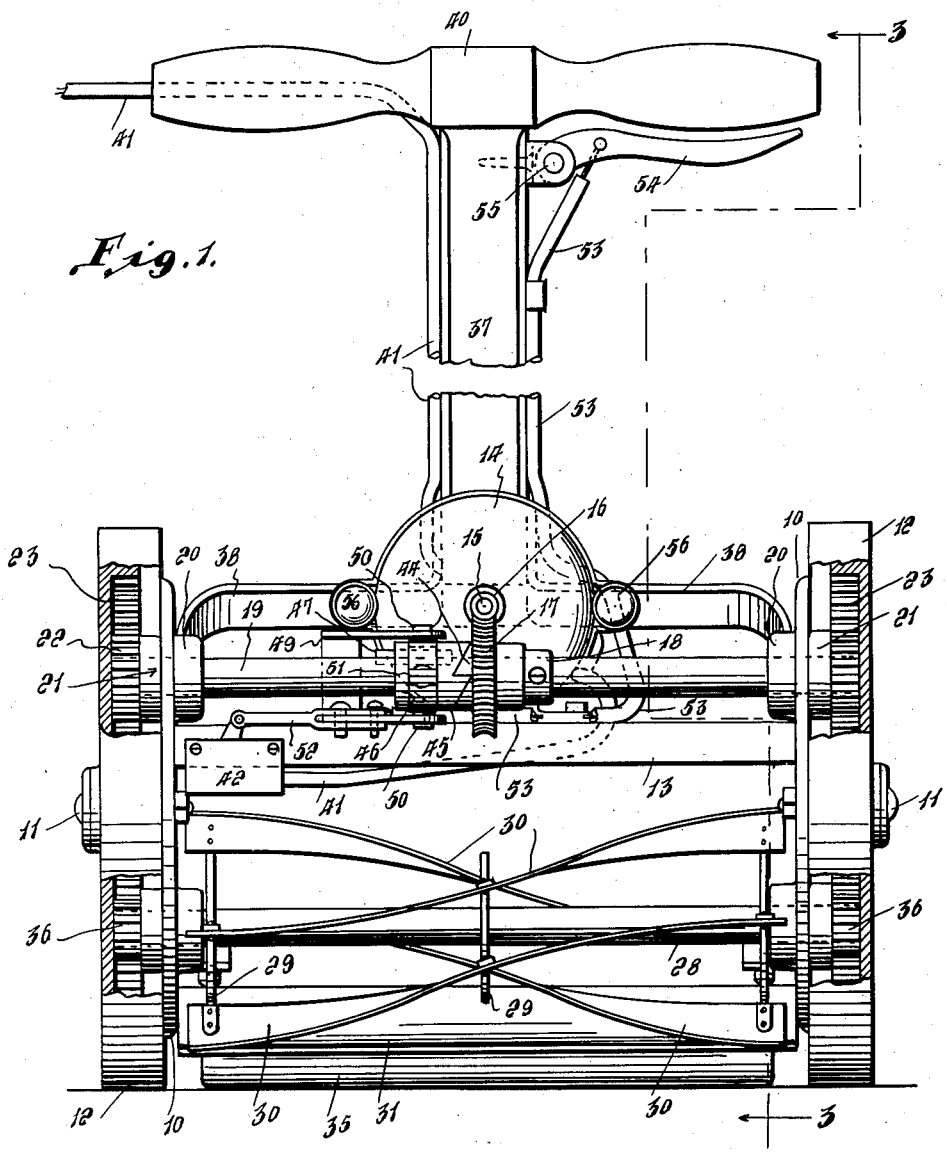
Figure 1 is a view of the mower in top elevation, partly being broken away to disclose details.
Figure 4:
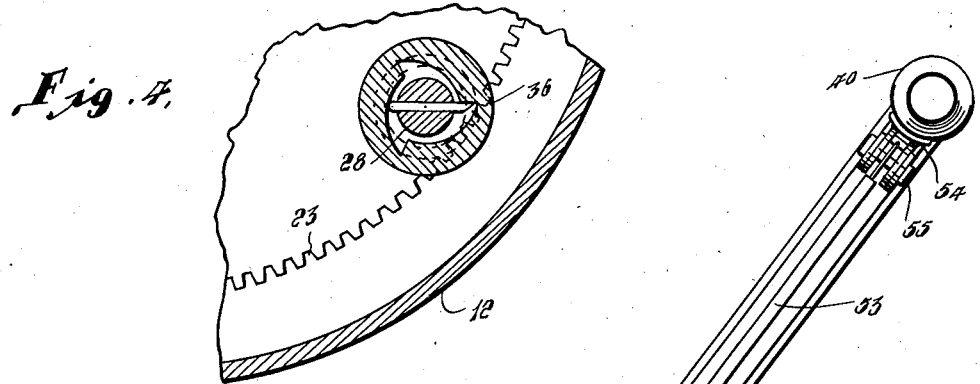
Figure 4 is a detail section taken on the plane of line 4—4 of Figure 2.
Figure 3:
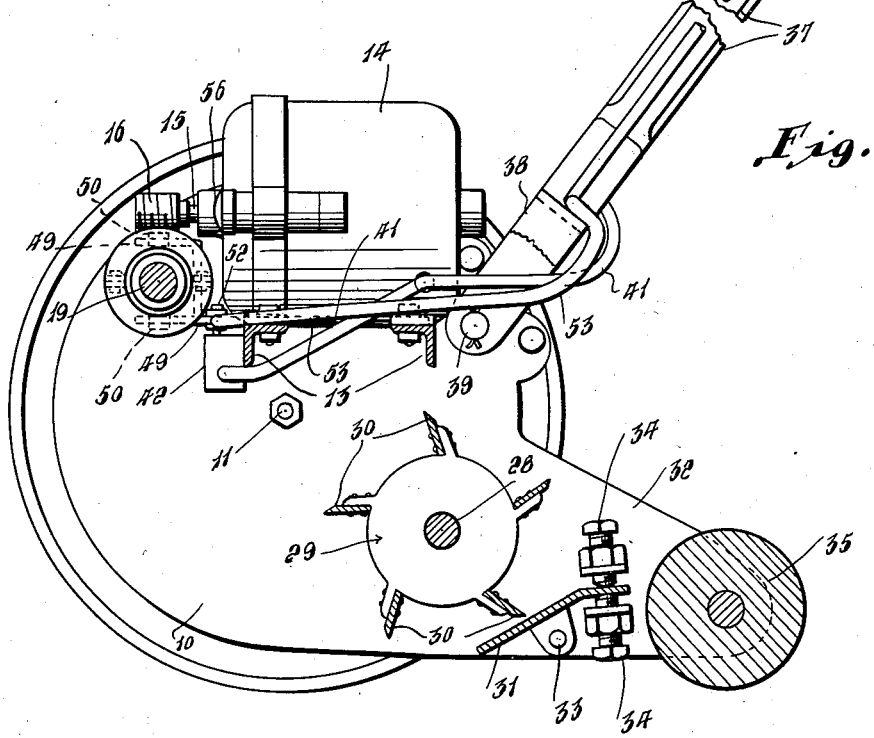
Figure 3 is a vertical section taken on the plane of line 3—3 of Figure 1.
Figure 5:
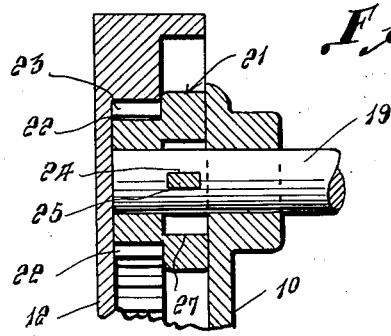
Figure 5 is a detail section taken on the plane of line 5—5 of Figure 2.

Referring specifically to the drawings wherein like reference characters designate like or similar parts, a pair of parallel side plates are provided at 10 each having a short axle or stud 11 rigid therewith, and which axles are aligned and have ground wheels 12 removably journaled thereon.

Suitable shelf means is disposed between the side plates 10, and rigidly connects them together and may consist of a pair of angle bars 13. An electric motor 14 is removably mounted on the angle bars 13 in any suitable manner. The main shaft of said electric motor, as at 15, is disposed at a right angle to said angle bars 13 and has a worm gear 16 keyed thereto which is enmeshed with a worm wheel 17 loose on a driving shaft 19 and positioned against displacement in one direction by a fixed collar 18. Said driving shaft 19 is journaled at opposite ends in bearings 20 of the side plates 10, and between such side plates and wheels 12, carrying combined pinions and clutches 21. These members 21 have gear teeth 22, enmeshed with internal annular gear teeth 23 within the wheels 12. Such members 21, when the motor 14 is energized, drive the wheels 12 when such members 21 are clutched to the shaft 19 through the medium of pins 24 which are slidable in diametric recesses 25 of the shaft 19 and engageable with shoulders 26 interiorly of members 21. Such clutching is constructed and arranged for forward propulsion of the wheels 12. However, upon movement of the mower in the opposite direction, the wheels 12 will simply slip, as in usual mower constructions, relative to the remainder of the machine, since internal cam surfaces 27 in the members 21, will simply slide the pins 24 transversely of the shaft 19 so that there can be no clutch engagement between the same and shoulders 26.

In the plates 10, a cutter or reel shaft 28 is journaled and a reel 29 is suitably carried thereby, having any desired number of cutters or blades at 30 which coact with a relatively fixed cutter blade 31 carried by extensions 32 of the side plates 10. Said cutter blade 31 is adjustable relatively to the blades 30 and to this end is pivotally connected as at 33 to the extensions 32 and the rear portion thereof extends between upper and lower screw means 34, which are adjustable to secure the blade 31 at various adjustments about the axis 33. At the rear end of the extensions 32, a trailer roller 35 is removably carried.

In order to operate the reel 29 through the rotation of the ground wheels 12, pinions 36 are carried by the shaft 28 and enmeshed with the previously mentioned gear teeth 23.

The mower has a suitable handle as at 37, from the lower end of which brackets 38 extend and are pivotally mounted at 39 to trunnions on the side plates 10. Such handle 37 at the upper end has a crossbar 40, through one side of which, an armored cable 41 extends and thence extends downwardly along the handle 37, being suitably guided, to the electric motor 14, with suitable connections to a conventional switch 42 mounted for instance on one of the angle bars 13. Electrically from any suitable source may be supplied through the cable 41 to the electric motor 14, whose operation is dependent upon the closing of the conventional switch 42.

The worm wheel 17 is part of or integral with a clutch having teeth for instance at 44 with which the teeth 45 of a sleevelike clutch member 46 cooperate. Such sleevelike clutch member 46 is slidable on shaft 19 to engage or disengage the teeth 44 and 45 and it also is mounted to turn with the shaft 19 through the medium of a spline as at 47. The clutch teeth 44 and 45 are normally disengaged through the contractile action of a spring 48 connected to one of the side plates 10 and to an L-shaped shifting lever 49 which is pivotally connected to the clutch member 46 at lugs 50 on a band 51 surrounding the same and pivotally connected at 52B to one of the angle bars 13.

A link connection 52 extends from the lever 49 to the switch 42 so as to actuate the switch 42 through the shifting of the clutch. When the clutch teeth are disengaged, the switch 42 will be opened but when the clutch teeth are engaged the switch will be closed. Such normally open clutch 46 is adapted to be closed at the will of the operator through the medium of a draw element such as a suitably guided cable or wire 53 which is connected to the lever 49 and extends along the side of the handle 37 to a lever 54, relatively close to one end of the transverse bar 40 of the handle and which is pivoted at 55 to a suitable part of the handle.

It is to be noted that one or more headlights 56 may be employed to enable operation of the mower at night. Such headlights are preferably located on opposite sides of the motor and electrically energized from the same source as the motor.

As a result of the construction described, the mower may be operated day or night and normally operated like the conventional mower since the clutch teeth at 44 and 45 are disengaged and which feature is of great value where electricity is not available and in the event of failure of the motor to operate. When the lever 54 is moved toward the handle bar 40, the clutch teeth at 44 and 45 will be thrown in and at the same time the switch 42 will be closed so that an electric circuit through the cable 41, is provided through the motor 14 in order to drive, through gearing 16 and 17, the shaft 19, wheels 22, ground wheels 12, pinions 36 and reel 29.

Various changes may be resorted to provided they fall within the spirit and scope of the invention.

I claim as my invention:

1. A mower having side plates, ground wheels outwardly of and journaled on said side plates, said side plates being approximately coextensive with the area of the ground wheels, shelf means rigidly connecting the side plates, an electric motor mounted on the shelf means disposed primarily above the axis of rotation of the ground wheels, a shaft above said axis journaled in the side plates, gearing between the electric motor and said shaft, gearing between said shaft and the ground wheels internally of the latter, the first mentioned gearing including a clutch having a movable part and a fixed part, means for the transmission of power to the electric motor including a switch, a handle for the mower, means controlled from the handle to shift the movable clutch part, means normally holding said movable clutch part disengaged from the fixed part so that in the event of failure of the motor the mower may be operated by the ground wheels, a connection from the movable clutch part to the switch to operate the latter, a reel, said reel having a shaft journaled in the side plates on the opposite side of said axis to the first mentioned shaft, and gearing to drive the last mentioned shaft from the gearing of the ground wheels.

2. A mower having side plates, ground wheels outwardly of and journaled on said side plates, shelf means rigidly connecting the side plates, an electric motor and control switch therefor mounted on the shelf means disposed primarily above the axis of rotation of the ground wheels, a shaft above said axis journaled in the side plates, gearing between the electric motor and said shaft, gearing between said shaft and the ground wheels internally of the latter, the first mentioned gearing including a clutch having a movable part mounted on said shaft, means normally maintaining the movable part of the clutch disengaged so that in the event of failure of the motor the mower may be operated by the ground wheels, a connection from the movable clutch part to the switch to operate the latter through movement of the movable clutch part, a reel, said reel having a shaft journaled in the side plates on the opposite side of said axis to the first mentioned shaft, and gearing to drive the last mentioned shaft from the gearing of the ground wheels.

WILLIAM C. KLEIN.